US011324052B2

(12) United States Patent
Irukulapati et al.

(10) Patent No.: US 11,324,052 B2
(45) Date of Patent: May 3, 2022

(54) TIMING ADVANCE RANGE ADAPTATION IN NEW RADIO

(71) Applicant: TELEFONAKTIEBOLAGET LM ERICSSON (PUBL), Stockholm (SE)

(72) Inventors: Naga Vishnu Kanth Irukulapati, Västra Frölunda (SE); Henrik Sahlin, Mölnlycke (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 63 days.

(21) Appl. No.: 16/753,264

(22) PCT Filed: Oct. 2, 2018

(86) PCT No.: PCT/IB2018/057661
§ 371 (c)(1),
(2) Date: Apr. 2, 2020

(87) PCT Pub. No.: WO2019/169240
PCT Pub. Date: Apr. 11, 2019

(65) Prior Publication Data
US 2020/0314909 A1  Oct. 1, 2020

Related U.S. Application Data

(60) Provisional application No. 62/566,859, filed on Oct. 2, 2017.

(51) Int. Cl.
*H04W 4/00* (2018.01)
*H04W 74/08* (2009.01)

(52) U.S. Cl.
CPC .............................. *H04W 74/0833* (2013.01)

(58) Field of Classification Search
CPC ..................... H04W 74/0833; H04W 74/0866
See application file for complete search history.

(56) References Cited

U.S. PATENT DOCUMENTS

| 2014/0044108 A1* | 2/2014 | Earnshaw ......... H04W 56/0045 |
| | | 370/336 |
| 2015/0045043 A1* | 2/2015 | Chou .................... H04W 24/02 |
| | | 455/446 |

(Continued)

FOREIGN PATENT DOCUMENTS

| EP | 2950461 A1 | 2/2015 |
| WO | 2012/106798 A1 | 8/2012 |

(Continued)

OTHER PUBLICATIONS

Ericsson, "Remaining details on RACH procedure", 3GPP TSG RAN WG1 Meeting #90bis, R1-1718716, Oct. 9-13, 2017.

(Continued)

*Primary Examiner* — Siren Wei
(74) *Attorney, Agent, or Firm* — Christopher & Weisberg, P.A.

(57) ABSTRACT

Systems and methods are described herein to permit the adaptation of the time advance range in cellular communication systems. An exemplary method includes receiving a physical random access channel (PRACH) preamble format from a network node, deriving a timing advance (TA) range for the wireless device based on the PRACH preamble format, and transmitting a PRACH preamble sequence to the network node. Associated wireless devices and network nodes are included.

24 Claims, 11 Drawing Sheets

(56) References Cited

U.S. PATENT DOCUMENTS

| | | | | |
|---|---|---|---|---|
| 2015/0296539 A1* | 10/2015 | Guo | ...................... | H04L 27/261 |
| | | | | 370/329 |
| 2015/0334707 A1* | 11/2015 | Rajagopalan | ......... | H04W 72/12 |
| | | | | 370/280 |
| 2018/0352527 A1* | 12/2018 | Wang | ................... | H04L 5/0091 |
| 2019/0230696 A1* | 7/2019 | Kim | ................. | H04W 72/1278 |
| 2021/0112599 A1* | 4/2021 | Gao | ...................... | H04L 5/0053 |

FOREIGN PATENT DOCUMENTS

| | | |
|---|---|---|
| WO | 2013/112952 A1 | 8/2013 |
| WO | 2017/014715 A1 | 1/2017 |

OTHER PUBLICATIONS

Ericsson, "NR PRACH design", 3GPP TSG-RAN WG1 Meeting #88, R1-1702127, Feb. 13-17, 2017.
3GPP TS 36.213: "Evolved Universal Terrestrial Radio Access (E-UTRA); Physical Layer Procedures", V14.2.0, Mar. 2017, pp. 50-55.
Catt, "Further details on NR 4-steps RA Procedure", 3GPP TSG RAN WG1 Meeting NE#3, R1-1715790, Sep. 18-21, 2017, Nagoya, Japan.

\* cited by examiner

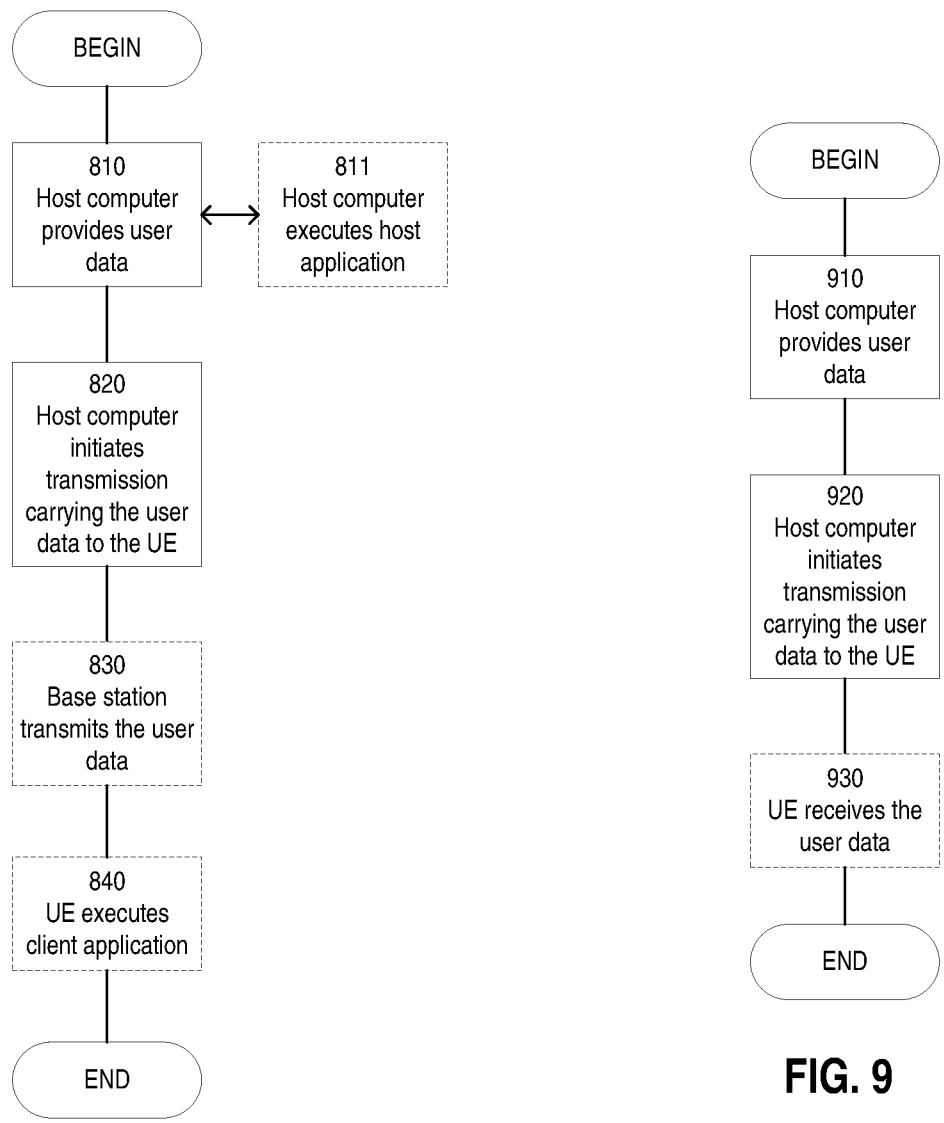

```
        BEGIN

│
  ┌───────┴────────┐      ┌────────────────┐
  │     1010       │      │     1011       │
  │ UE receives    │◄────►│  UE executes   │
  │ input data     │      │ client         │
  │ provided at    │      │ application    │
  │ host computer  │      │                │
  └───────┬────────┘      └────────────────┘
          │
  ┌───────┴────────┐      ┌────────────────┐
  │     1020       │      │     1021       │
  │ UE provides    │◄────►│  UE executes   │
  │ user data      │      │ client         │
  │                │      │ application    │
  └───────┬────────┘      └────────────────┘
          │
  ┌───────┴────────┐
  │     1030       │
  │ UE initiates   │
  │ transmission of│
  │ the user data  │
  │ to the host    │
  │ computer       │
  └───────┬────────┘
          │
  ┌───────┴────────┐
  │     1040       │
  │ Host computer  │
  │ receives user  │
  │ data           │
  │ transmitted    │
  │ from the UE    │
  └───────┬────────┘
          │
        END
```

FIG. 10

```
        BEGIN
          │
  ┌───────┴────────┐
  │     1110       │
  │ Base station   │
  │ receives user  │
  │ data from UE   │
  └───────┬────────┘
          │
  ┌───────┴────────┐
  │     1120       │
  │ Base station   │
  │ initiates      │
  │ transmission of│
  │ user data to   │
  │ the host       │
  │ computer       │
  └───────┬────────┘
          │
  ┌───────┴────────┐
  │     1130       │
  │ Host computer  │
  │ receives the   │
  │ user data      │
  └───────┬────────┘
          │
        END
```

FIG. 11

TIMING ADVANCE RANGE ADAPTATION IN NEW RADIO

PRIORITY CLAIM

The application is a national stage application of International Patent Application No. PCT/IB2018/057661, filed Oct. 2, 2018, which claims the benefit of and priority to U.S. Provisional Patent Application 62/566,859, entitled "Timing Advance Range Adaptation in New Radio" and filed on Oct. 2, 2017, the disclosure of which is hereby incorporated in its entirety.

TECHNICAL FIELD

The disclosed subject matter relates generally to telecommunications. Certain embodiments relate more particularly to concepts such as Time Alignment, New Radio (NR), physical random access channel (PRACH) random access response (RAR), and/or Timing Advance (TA).

BACKGROUND

Different PRACH preamble formats are defined in NR with each format supporting different cell radius and thereby different cell size (small cells, normal cells). These preamble formats are divided into long sequence and short sequence. Long sequence preamble formats are similar to the ones in LTE. However, in NR, to support, small cell operation, several short sequence preamble formats are also defined. Multiple numerologies in NR might also affect the size of the timing advance.

In section 6.2.3 of 3GPP 36.321-e20, a TA command field indicates the index value TA (0, 1, 2 . . . 1282) used to control the amount of timing adjustment that the MAC entity has to apply (see subclause 4.2.3 [1]). The size of the Timing Advance Command field is 11 bits. The size of the TA command field is referred to as TA range.

SUMMARY

In certain embodiments of the disclosed subject matter, methods are provided for adapting the TA range based on the PRACH preamble format. The network (NW) may configure the PRACH preamble format and signal it to the UE. There is a one-to-one mapping between the PRACH preamble formats and the TA range.

Certain embodiments are presented in recognition of shortcomings associated with conventional techniques and technologies, such as the following examples. In NR, with different PRACH preamble formats, a fixed TA range may not be optimal anymore. For instance, having one TA range both for small cell and normal cell operation is not efficient. If the cell is configured to use the TA range based on normal cell, then it is waste of resources. Having the TA size suitable for small cell implies that normal cells cannot be supported with respect to time alignment.

Certain embodiments may provide potential benefits compared to conventional techniques and technologies, such as the following examples. With different TA ranges for different PRACH preamble formats, one can support low latency applications and also reduce resource overhead.

BRIEF DESCRIPTION OF THE DRAWINGS

The drawings illustrate selected embodiments of the disclosed subject matter. In the drawings, like reference labels denote like features.

FIG. 8 illustrates methods implemented in a communication system including a host computer, a base station and a user equipment in accordance with some embodiments.

FIG. 9 illustrates methods implemented in a communication system including a host computer, a base station and a user equipment in accordance with some embodiments.

FIG. 10 illustrates methods implemented in a communication system including a host computer, a base station and a user equipment in accordance with some embodiments.

FIG. 11 illustrates methods implemented in a communication system including a host computer, a base station and a user equipment in accordance with some embodiments.

DESCRIPTION OF EMBODIMENTS

Figure 1:
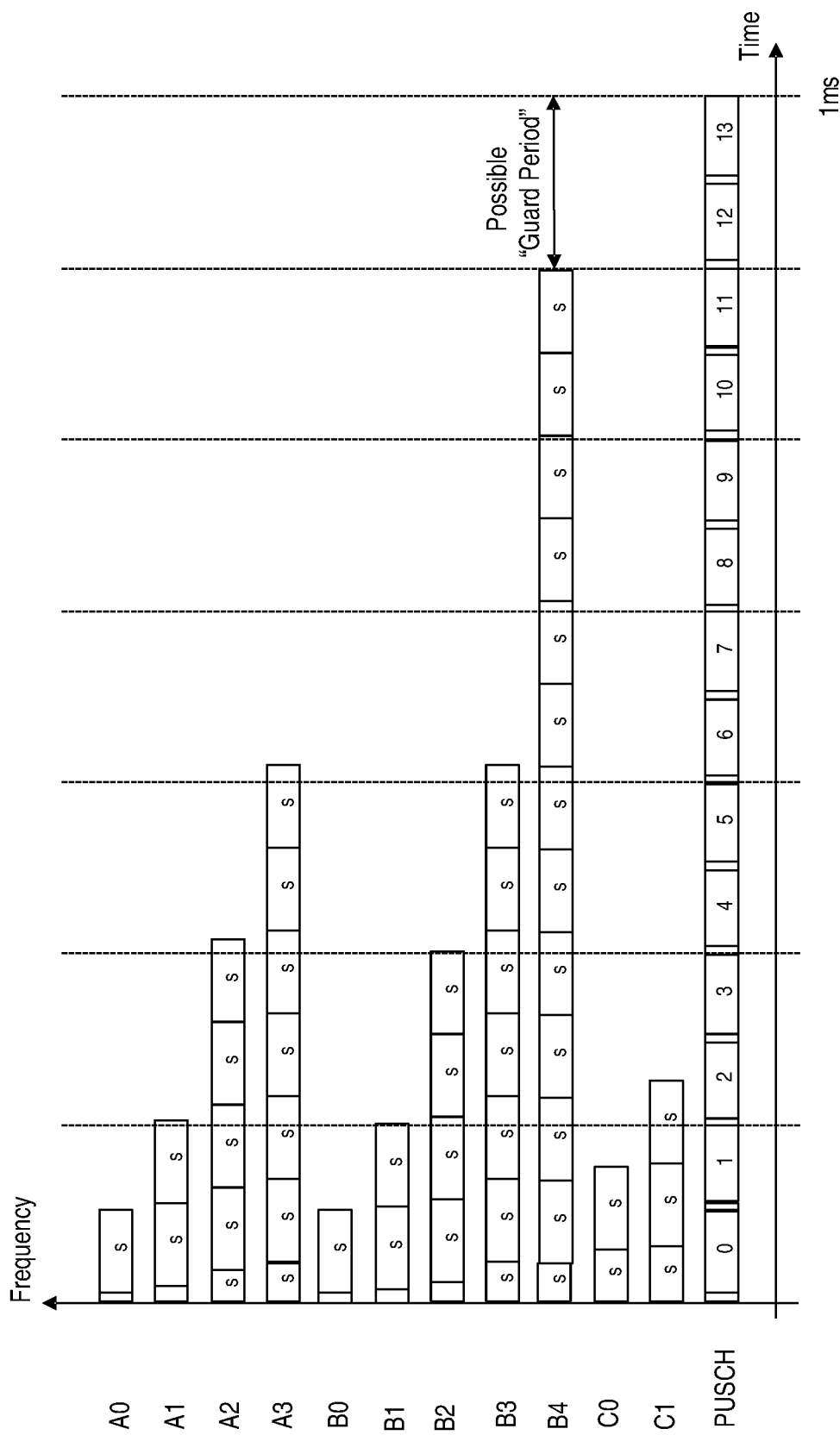
FIG. 1 illustrates NR-RACH preamble formats in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in any document(s) provided in an Appendix hereto.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

In Table 1, a short preamble sequence formats along with maximum cell radius and use cases is listed. As can be seen from the table, there are mainly two types of use cases: small cell and normal cell operation.

TABLE 1

Short PRACH preamble sequences with maximum cell radius and use cases

| Preamble format | | # of Sequence | TCP | TSEQ | TGP | Path profile (Ts) | Path profile (us) | Maximum Cell radius (meter) | Use case |
|---|---|---|---|---|---|---|---|---|---|
| A | 0 | 1 | 144 | 2048 | 0 | 48 | 1.56 | 469 | TA is already known or Very small cell |
|   | 1 | 2 | 288 | 4096 | 0 | 96 | 3.13 | 938 | Small cell |
|   | 2 | 4 | 576 | 8192 | 0 | 144 | 4.69 | 2,109 | Normal cell |
|   | 3 | 6 | 864 | 12288 | 0 | 144 | 4.69 | 3,516 | Normal cell |
| B | 1 | 2 | 216 | 4096 | 72 | 96 | 3.13 | 469 | Small cell |
|   | 2 | 4 | 360 | 8192 | 216 | 144 | 4.69 | 1,055 | Normal cell |
|   | 3 | 6 | 504 | 12288 | 360 | 144 | 4.69 | 1,758 | Normal cell |
|   | 4 | 12 | 936 | 24576 | 792 | 144 | 4.69 | 3,867 | Normal cell |
| C | 0 | 1 | 1240 | 2048 | 0 | 144 | 4.69 | 5300 | Normal cell |
|   | C2 | 4 | 2048 | 8192 | 2916 | 144 | 4.69 | 9200 (1160 in case of 120 kHz SCS)) | Normal cell |

The first two rows of Table 2 illustrate PRACH formats and corresponding maximum cell radius for a sub-carrier spacing (SCS) of 15 kHz of the NR-RACH preamble.

TABLE 2

Number of bits, N, for same SCS of PRACH and MSG3

| Formats (Use case) | A0 (very cell) | A1 (small cell) | A2 (normal cell) | A3 (normal cell) | B1 (small cell) | B2 (normal cell) | B3 (normal cell) | B4 (normal cell) | B41 (normal cell) | C0 (normal cell) | C2 (normal cell) |
|---|---|---|---|---|---|---|---|---|---|---|---|
| Max. cell radius (m) | 469 | 938 | 2109 | 3516 | 469 | 1055 | 1758 | 3867 | 24570 | 5300 | 9200 |
| Num bits | 2.58 | 3.58 | 4.75 | 5.49 | 2.58 | 3.75 | 4.49 | 5.63 | 8.29 | 6.08 | 6.88 |
| N | 3 | 4 | 5 | 6 | 3 | 4 | 5 | 6 | 9 | 6 | 7 |

The maximum cell radius for format B4 can be larger than 3 867 meters, if the gap after the preamble within a slot is considered. See illustration of format B4 in FIG. 1, with a gap of 792+144+2048+144+2048=5176 samples from end of B4 to the end of the slot, which corresponds to 24 570 meters. Detection of delays larger than the length of one OFDM symbol is described in [2] together with performance evaluations with a cell radius up to 20 km (delays up to 2 OFDM symbols with SCS of 15 kHz).

The number of bits needed for the TA (third row of the Table 2) is computed using the following equation (1).

$$\text{Num bits} = \log 2 \frac{2D\text{max}}{c16Ts} \quad (1)$$

In equation (1), Dmax is the maximum cell radius (row 2 of Table 2), c is the velocity of light, and Ts is inverse of the SCS of the Msg3. The fourth row of the Table 2 is rounding to the closest integer larger than the number of bits in row 3.

This Table 2 is only valid for a sub-carrier spacing (SCS) of 15 kHz of the NR-RACH preamble. If the SCS of the NR-RACH preamble is doubled, then the maximum cell radius is reduced by a factor of two. The number of bits for TA is thus a function of the SCS of the NR-RACH preamble.

In summary, we observe that the number of bits for TA can be formulated as a function of both the SCS of PRACH and the SCS of MSG3.

If we base the number of bits needed for TA both on PRACH SCS and MSG3 SCS, we obtain Table 1. When we fix PRACH SCS (=>fixed Dmax) and change MSG3 SCS (=>Ts

[1] Preamble format with two extra OFDM symbols as Guard Period change), we get log2(2)=1 bit extra for each SCS change (as can be seen for each column). Alternatively, if we fix MSG3 SCS and change PRACH SCS, then there is one less bit needed (−log2(2)) as can be seen if we fix a row and go across column wise. For the diagonal elements, as the SCS for PRACH and MSG3 both changes proportionally, there is no change in the number of bits needed for TA.

TABLE 3

TA range for different SCS of PRACH and MSG3

| | | PRACH SCS | | | | |
|---|---|---|---|---|---|---|
| TA range | | 15 kHz | 30 kHz | 60 kHz | 120 kHz | 240 kHz |
| MSG3 SCS | 15 kHz | N | N − 1 | N − 2 | N − 3 | N − 4 |
| | 30 kHz | N + 1 | N | N − 1 | N − 2 | N − 3 |
| | 60 kHz | N + 2 | N + 1 | N | N − 1 | N − 2 |

TABLE 3-continued

TA range for different SCS of PRACH and MSG3

| TA range | PRACH SCS | | | | |
| --- | --- | --- | --- | --- | --- |
| | 15 kHz | 30 kHz | 60 kHz | 120 kHz | 240 kHz |
| 120 kHz | N + 3 | N + 2 | N + 1 | N | N − 1 |
| 240 kHz | N + 4 | N + 2 | N + 2 | N + 1 | N |

The N, N+1, and N−1 cells of Table 3 are what seems to be more relevant for efficient resource usage and better use of channel For example, it does not make sense to use a 15 kHz PRACH SCS with 240 kHz MSG3. We see that in this setup the TA range is between [N−1, N+1], where N is defined in Table 3. From Table 2 and Table 3, it seems reasonable to use of TA of 5 bits (N+1 of A1 format) for small cells use case (A0, A1, B1) and 10 bits (N+1 of B4 extended delay use case) for rest of the short sequence formats.

Besides the short preamble formats A-C introduced in Table 2, there is an agreement also on the long PRACH preamble formats 0, 1, and 4, which are based on 1.25 kHz SCS, while format 3 is based on 5 kHz SCS. These formats are similar to the LTE PRACH formats where TA range is 11 bits. It seems reasonable to define at least as many bits for NR as was defined for LTE, in order to support at least the same cell radius in LTE and NR.

TABLE 4

Mapping between PRACH preamble format and TA range

| PRACH preamble format | Defined TA range |
| --- | --- |
| Small cell (e.g, A0, A1, B1) | Small size (e.g., 5 bits) |
| Rest of the formats | Large size (e.g. 11 bits) |

In some embodiments, the TA range can be a function both the SCS of PRACH and the SCS of MSG3.

In one embodiment, a TA range as defined herein can be lead to different sizes in TA for the MAC protocol.

Figure 2:
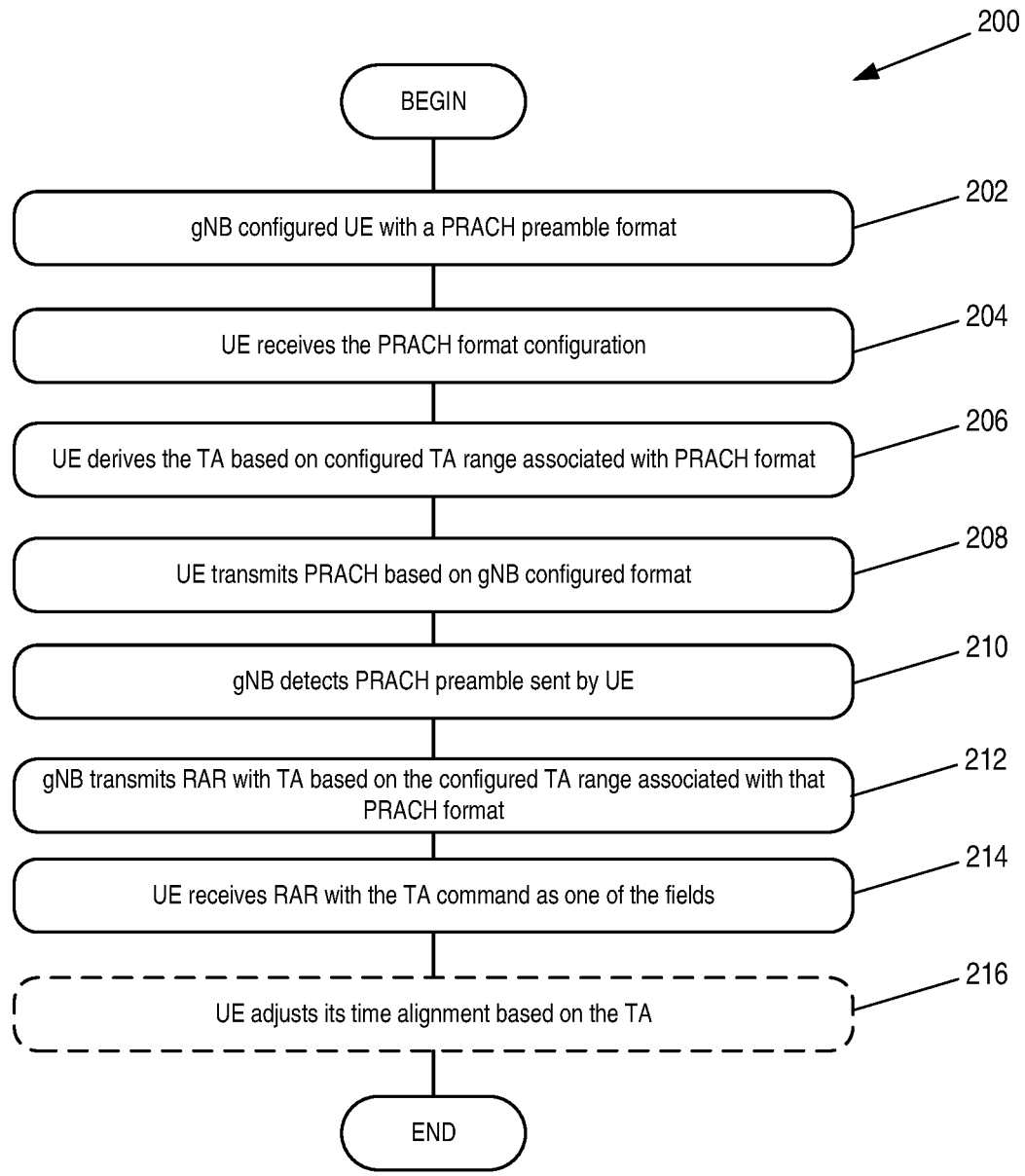
FIG. 2 is a flow diagram illustrating a method in accordance with some embodiments.

FIG. 2 illustrates a method 200, in accordance with some embodiments. More specifically, FIG. 2 is a flow diagram illustrating different steps involved at a gNB and at a UE or wireless device (WD). In this example, a table similar to Table 4 will be available both at the gNB and also at the UE. This table gives a one-to-one mapping between the PRACH preamble format and the TA range to be used.

As a first step (step 202), gNB configures the PRACH preamble format to be used by the UE and sends out this configuration.

The UE receives this PRACH preamble format configuration (step 204) and derives the TA using the TA range (e.g., using table similar to Table 4 that is available at the UE) (step 206).

The UE transmits the PRACH preamble sequence based on the configured format (208). gNB then detects this preamble sequence (210) and transmits RAR (step 212).

One of the fields in RAR is the index of the TA field which is based on the TA range. The gNB uses the TA range that is already pre-defined in the table similar to Table 4 at the gNB side (step 210.

Thereafter, the UE receives the RAR (step 214).

Additionally, the UE may adjust its time based on the TA (step 216).

Figure 3:
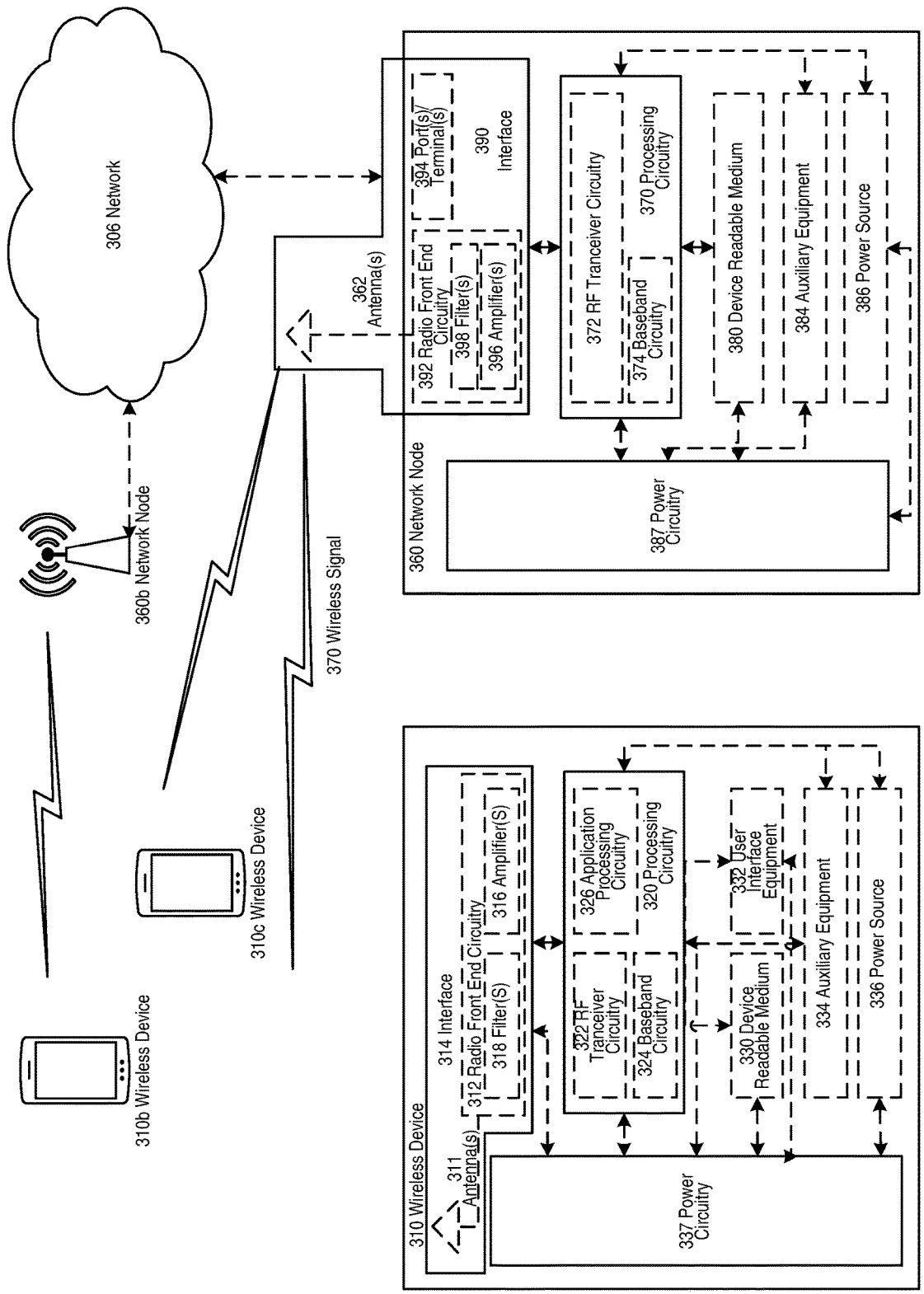
FIG. 3 illustrates wireless network in accordance with some embodiments.

FIG. 3 illustrates wireless network in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and WDs 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device (WD) 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or fTA valuewireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314.

Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
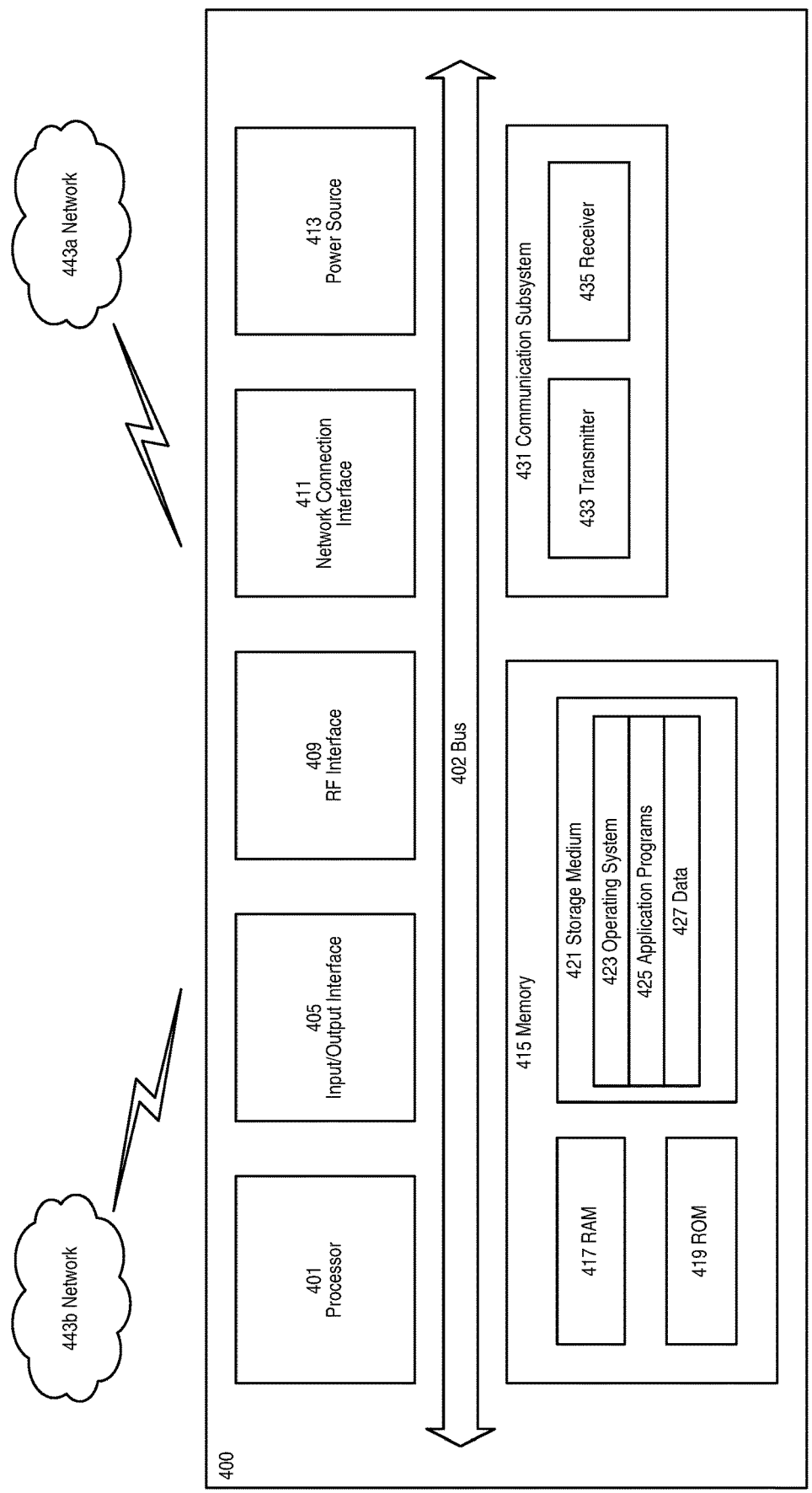
FIG. 4 illustrates a user equipment in accordance with some embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.4, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
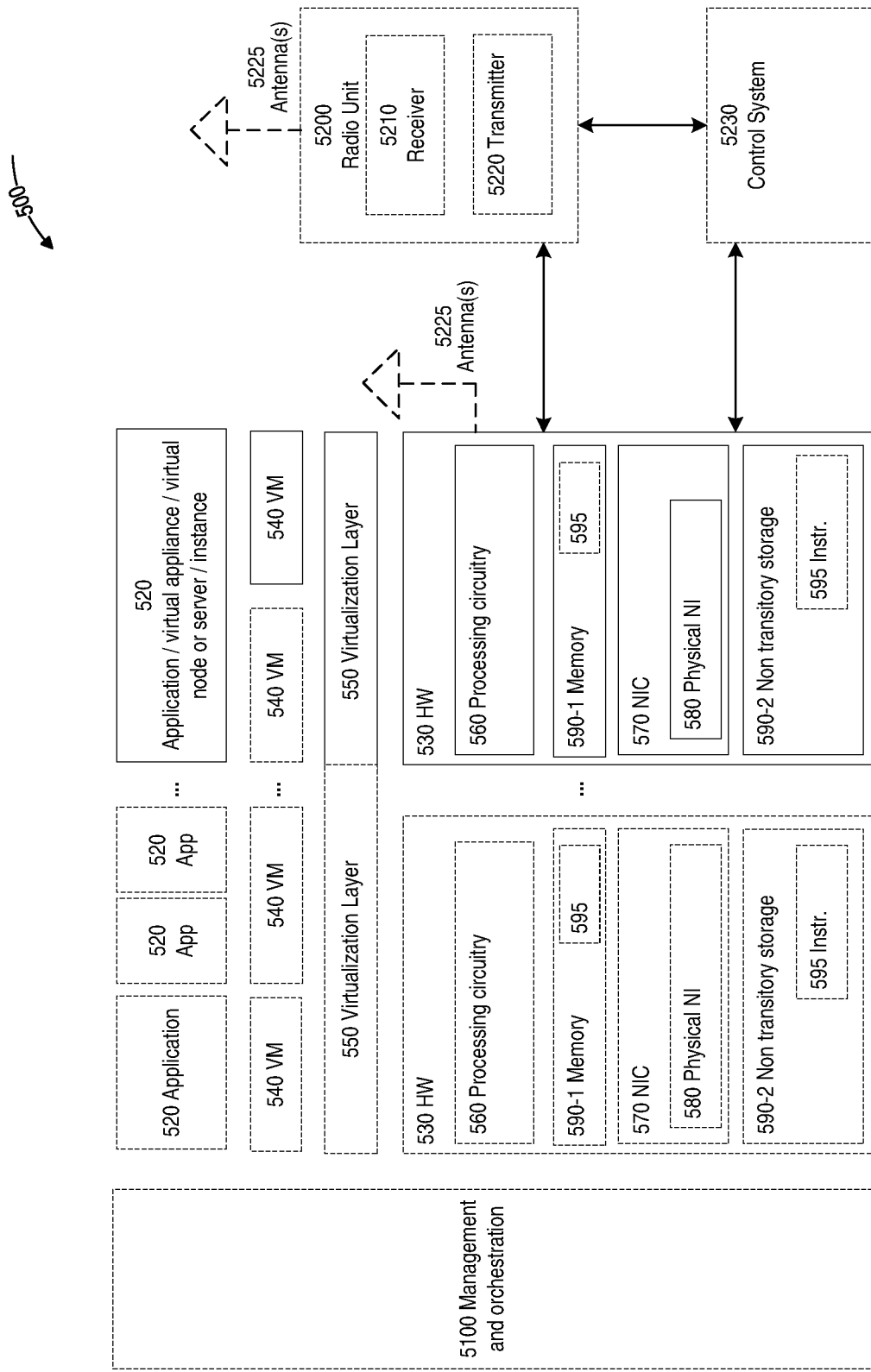
FIG. 5 illustrates a virtualization environment in accordance with some embodiments.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features, and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 6:
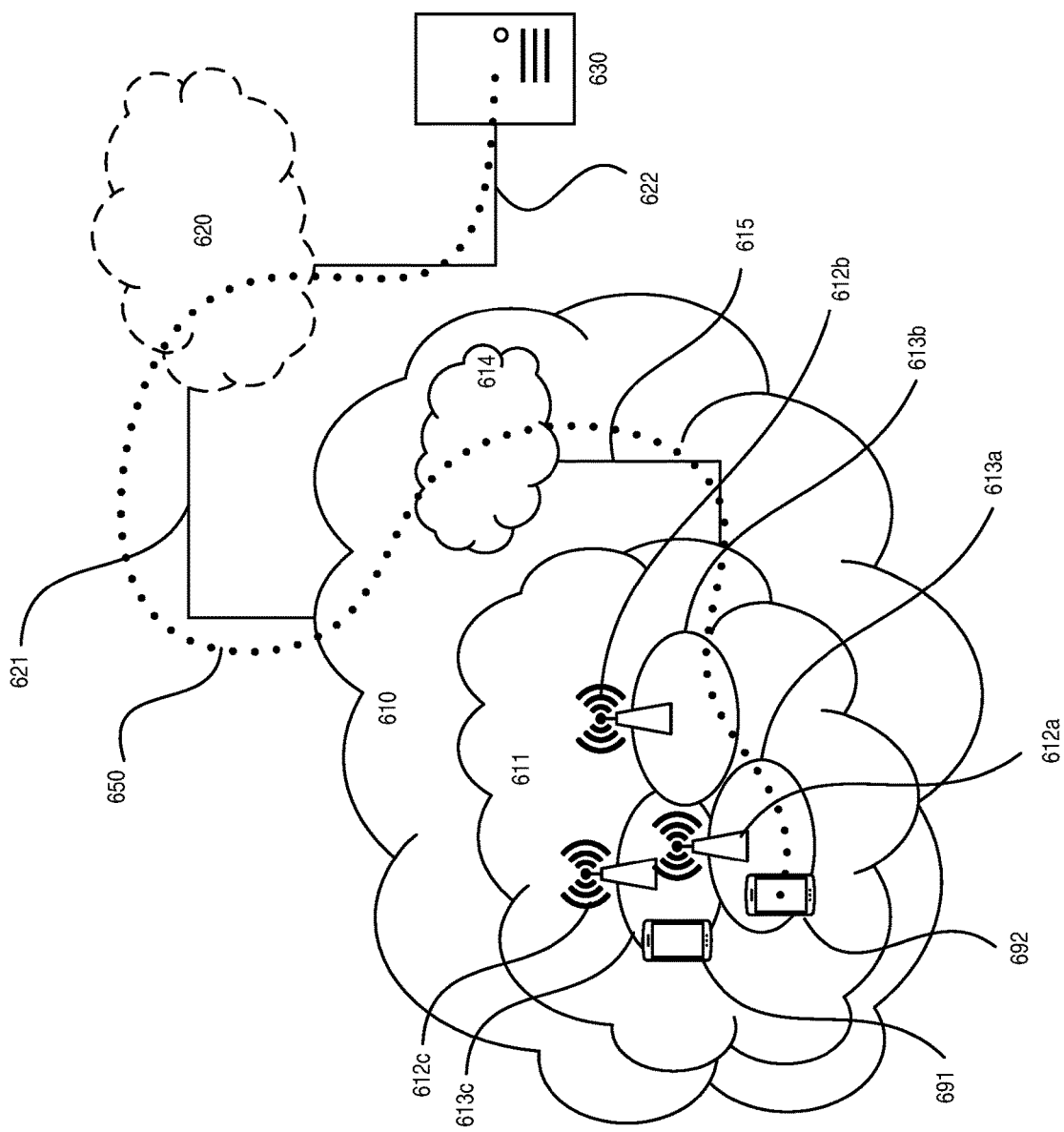
FIG. 6 illustrates a telecommunication network connected via an intermediate network to a host computer in accordance with some embodiments.

FIG. 6 illustrates a telecommunication network connected via an intermediate network to a host computer in accordance with some embodiments Referring to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more subnetworks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 7:
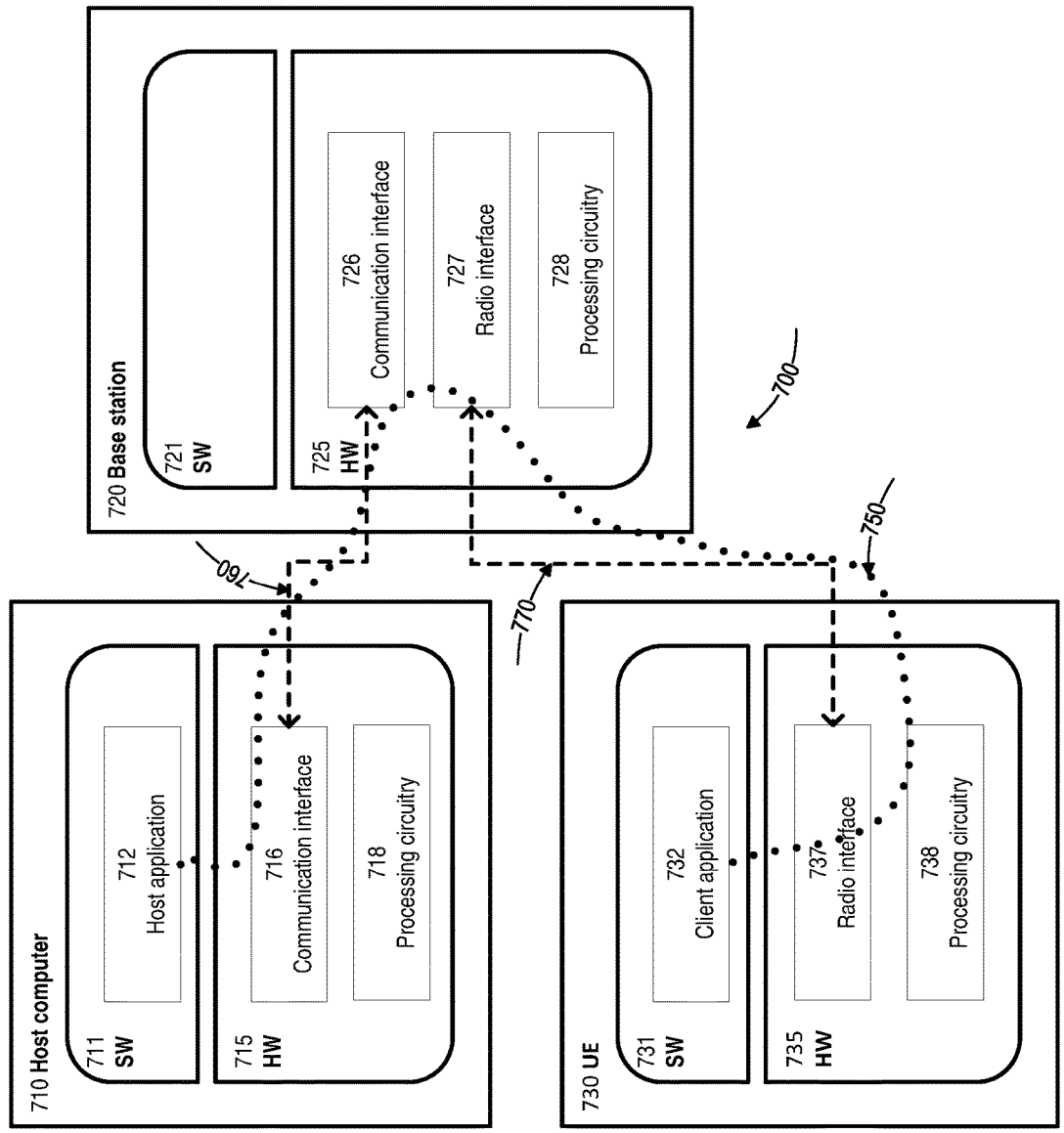
FIG. 7 illustrates a host computer communicating via a base station with a user equipment over a partially wireless connection in accordance with some embodiments.
Figure 12:
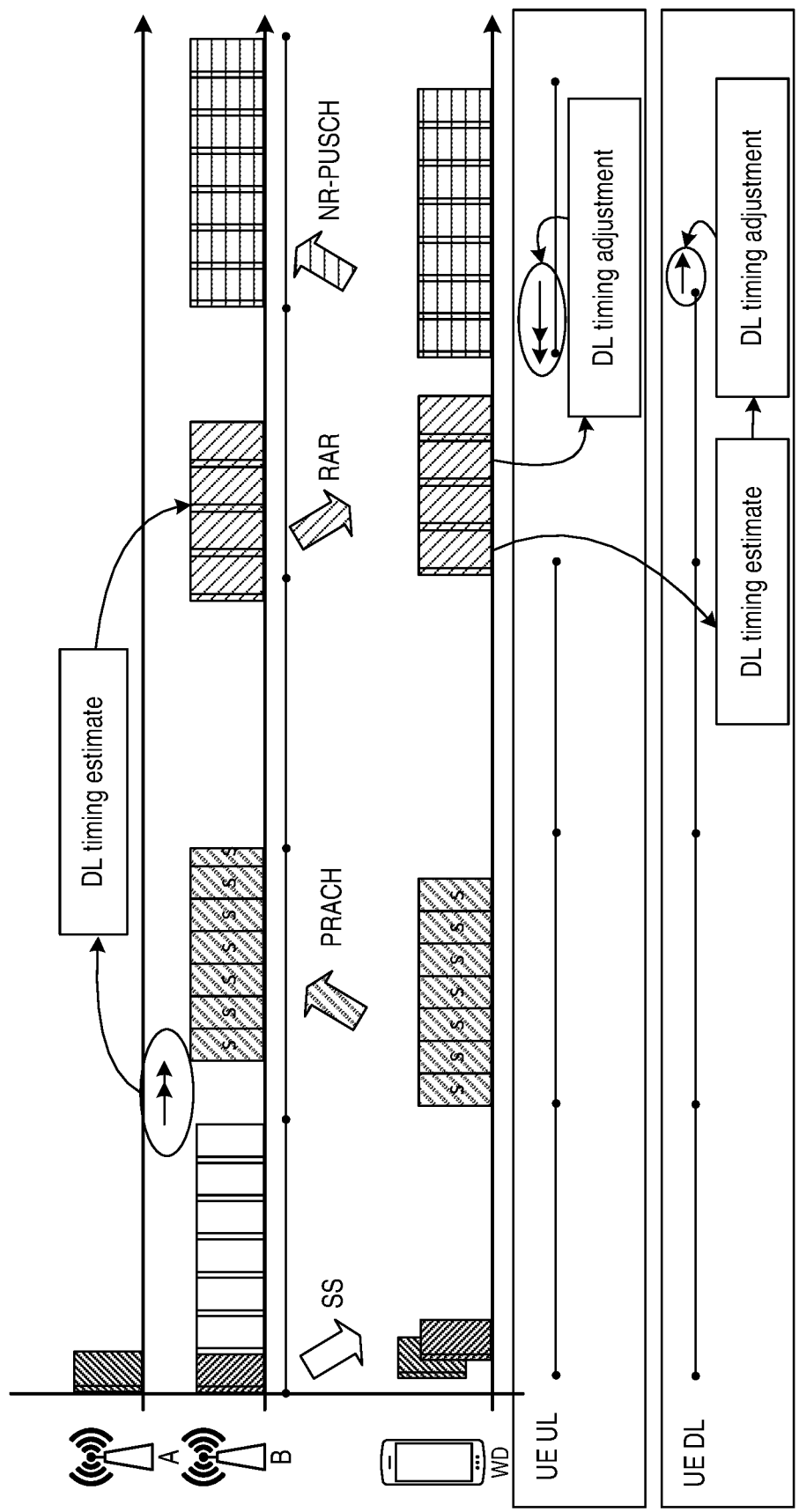
FIG. 12 illustrates uplink and downlink synchronization in a 4-step initial access procedure in accordance with some embodiments.

FIG. 7 illustrates a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the efficiency of underlying communication technologies used by an OTT service, which can produce improved reliability and responsiveness in the OTT service.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

FIG. 8 is a flowchart illustrating a method implemented in a communication system, in accordance with one embodiment. The communication system includes a host computer, a base station and a UE which may be those described with reference to FIGS. 6 and 7. For the sake of brevity, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

The following agreements were made related to the RAR window during the 3GPP TSG RAN WG1 Meeting 90bis in Prague, CZ, 9-13, Oct. 2017 in Agenda Item 7.1.4.2, entitled "Remaining details on RACH procedure," by Ericsson.

Introduction

Agreements in RAN1 #87ah: For 4-step RACH procedure, NR at least supports transmission of a single Msg.1 before the end of a monitored RAR window NR 4-step RACH procedure design should not preclude multiple Msg.1 transmissions until the end of RAR window if need arises.

Agreements in RAN1 #88: Following is baseline UE behaviour: UE assumes single RAR reception at a UE within a given RAR window; and NR random access design should not preclude UE reception of multiple RAR within a given RAR window, if need arises.

Agreements in RAN1 #90: For single Msg1 RACH, the RAR window starts from the first available CORESET after a fixed duration from the end of Msg1 transmission: the fixed duration is X T_s; X is the same for all RACH occasions; FFS: whether CORESET starting position is aligned with slot boundary; FFS: the value of X; and FFS: whether X is frequency range dependent. For a single Msg1 RACH from UE: The size of a RAR window is the same for all RACH occasions and is configured in RMSI. RAR window could accommodate processing time at gNB, the maximum window size depends on worst case gNB delay after Msg1 reception including processing delay, scheduling delay, etc., the minimum window size depends on duration of Msg2 or CORESET and scheduling delay, and FFS: multiple Msg1 RACH case if supported.

Agreements in RAN1 #AH3: For RAR, X can be supported for the timing gap between the end of MSg1 transmission and the starting position of the CORESET for RAR, with the value of X=ceiling($\Delta$/(symbol duration))*symbol duration, where the symbol duration is based on the RAR numerology and where $\Delta$ is to accommodate sufficient time for UE Tx-Rx switching if needed (e.g., for TDD). Note: UE Tx-Rx switching latency is up to RAN4

The following agreements were made regarding contents of RAR:

Agreements in RAN2 #99: The following fields are always included in the RAR random access procedures: RAPID, UL grant, TA, Temporary C-RNTI for all cases other than msg. 1 SI request. BI can be included in msg. 2 as in LTE. UE behaviour with respect to backoff is the same as in LTE.

Agreements in RAN1 #AH3: Msg3 is scheduled by the uplink grant in RAR. Msg3 is transmitted after a minimum time gap from the end of Msg2 over-the-air reception. gNB has the flexibility to schedule the transmission time of Msg3 while ensuring the minimum time gap. FFS the minimum time gap with respect to UE processing capability.

The following agreements were made related to RAR transmission:

Agreements in RAN1 #90: At least for initial access, RAR is carried in NR-PDSCH scheduled by NR-PDCCH in CORESET configured in RACH configuration. Note: CORESET configured in RACH configuration can be same or different from CORESET configured in NR-PBCH.

Agreements in RAN1 #AH3: At least for initial access, the PDSCH for RAR is confined within NR UE minimum DL BW for a given frequency band, the PDSCH for Msg4 is confined within NR UE minimum DL BW for a given frequency band, and FFS: If PDSCH for RAR and Msg4 are confined within initial active DL BWP.

Agreements in RAN 1 #AH3: NR supports at least slot based transmission of Msg2, Msg3 and Msg4. Check if slot based scheduling can satisfy ITU requirement. If not, investigate ways to meet ITU requirement, e.g., non-slot based transmission of Msg2, Msg3 and Msg4.

In RAN1 #89, the following agreements on PRACH power ramping were reached: If the UE conducts beam switching, the counter of power ramping remains unchanged. FFS: UE behavior after reaching the maximum power. RAN1 will definitely decide above FFS point. NR does not support to report UE capability of beam correspondence during RACH procedure. Note that UE capability of beam correspondence is reported after RACH procedure.

In RAN1 NR AH#2, further agreements on PRACH power ramping were reached. The UE calculates the PRACH transmit power for the retransmission at least based on the most recent estimate pathloss and power ramping. The pathloss is measured at least on the SS block associated with the PRACH resources/preamble subset. UE behavior when reaching the maximum power: if the recalculated power is still at or above the Pc,max, the UE can transmit at maximum power even if it changes its TX beam.

In RAN1 #90, further agreements on PRACH power ramping were reached. SS block selection: It is up to UE implementation how to select the SS block and corresponding PRACH resource for path-loss estimation and (re) transmission based on SS blocks that satisfy threshold(s). If UE does not detect a SS block that satisfy threshold(s), it has the flexibility to select any SS block that allows UE to meet the target received power of the RACH preamble with its maximum transmit power. UE has a flexibility to select its RX beam to find the list of SS blocks that satisfy the threshold(s). FFS: whether threshold(s) for SS block selection is configured or fixed in the specification. Counter of power ramping when UE changes its selected SS-block in message 1 re-transmission is unchanged. SS block Tx power and RA Power control: UE computes pathloss based on "SS block transmit power" and SS block RSRP, at least one "SS block transmit power" value is indicated to UE in RMSI, FFS: whether and how to support multiple values. Note: different SS blocks in an SS burst set can be transmitted with different power and/or with different Tx beamforming gain at least as NW implementation. Maximum Number of PRACH Transmission: NR supports the total maximum number of transmissions, M (like LTE), per carrier to indicate Random Access problem, and M is NW configurable parameter.

Issues then to be discussed further included which SS block the UE should base the selection of the PRACH resources on, and if the UE is allowed to change SS block used for the path loss estimate for retransmission.

Below, we discuss about random access response (RAR), which is message 2 of the 4-step random access channel (RACH) procedure. Configuration of message 3 of RACH will be briefed. Power ramping procedure will be described in [1]. Power settings for Message 3 will be described. This contribution is revised from R1-1716155.

Random Access Response

Random access procedure is used for initial system access, transition from idle to active mode, and handover. It is a critical part of an efficient cellular network design. A proposed design for the NR 4-step random access procedure is illustrated in FIG. 122. Here, two synchronization signals (SS) blocks (SSBs) are transmitted from separate nodes (gNB A and B), and received with a relative timing difference.

The UE selects a DL timing reference based on received SS block from gNB A and transmits a NR-RACH preamble based on this DL timing. Both gNB A and gNB B might detect RACH such that gNBs might then transmit RAR or the nodes might be coordinated such that only one of them transmits RAR. In the following, only gNB B transmits the RAR. The random access procedure for NR should reuse the main principles of the LTE design. However, since a wider range of deployment scenarios and increased requirements on lean design are expected, some changes to the legacy procedures are necessary. In particular, RACH transmission principles need refinement. In this contribution Msg2 will be referred as RAR (random access response).

The RAR should contain an indication of detected NR-RACH preamble. In LTE, the PDCCH is scrambled by using the RA-RNTI is given by the equation (2)

$$\text{RA-RNTI} = 1 + t\_id + 10 \cdot f\_id \qquad (2)$$

In equation (2) t_id is the index of the first subframe of the specified RACH ($0 \leq t\_id < 10$) within one radio frame of 10 ms, and f id is the index of the specified RACH within that subframe, in ascending order of frequency domain ($0 \leq f\_id < 6$).

In NR, the RA-RNTI can be computed in a similar manner but with some modifications. For example, the slot can be used in t_id to handle different transmission lengths of sub-carrier spacings. This would also mean the "10" should be replaced by the number of slots in a radio frame for the sub-carrier spacing used. For example, with a sub carrier spacing of 120 kHz, there are 80 slots per radio frame. The number of NR-RACH preambles per cell will be most likely needs to be larger than 64, at least for higher carrier frequencies, see discussion in [1]. However, the RAPID within RAR should fit into one octet (8 bits), together with possible extension and type bits. Furthermore, the RAR sub-header carrying the RAPID should be designed in a future proof way, such that modifications are not needed if number of SSBs and thus number of preambles in a cell further increase.

One possible solution would be to include the SSB index into the RA-RNTI. Then the the RAPID would indicate the preamble index in the set of preambles assocciated to one SSB. In this way, the RAPID in the RAR can be kept within a reasonable number of bits. More specifically, it seems be possible to keep the RAPID, extension bit and type field within one octet. However, with a many-to-one association between SSB and RACH preambles, then the gNB cannot identify the best SSB (as detected by UE) based on detected RACH preamble. Instead the gNB will only know the group of SSBs which are assocated to the same set of RACH preambles. If we define an index for each such group of SSBs, assosiated to the same set of RACH preambles, as an "SSB_assoc_index", then we can include that association group index into the RA-RNTI. For example, the RA-RNTI is calculated as in equation (3).

$$\text{RA-RNTI} = 1 + slot\_id + X \cdot SSB\_assoc\_index + X \cdot Y \cdot f\_id \qquad (3)$$

In equation 3, X=80, i.e. a design which supports at least 80 slots per frame corresponding to 120 kHz SCS in uplink and Y=64, i.e. the number of SSBs per SSB burst set, with a RA-RNTI that depends on SSB group index, then only RACH preamble index associated with the same SSB group can be multiplexed into the same RAR. This supports the beamforming of one RAR to several UEs with the same beamforming as the SSB.

With a one-to-one association between SSB index and PRACH preambles, the "SSB_assoc_index" equals the SSB index. With a many-to-one mapping between SSB and PRACH preambles, then several SSBs are associated with the same set of RACH preambles. The SSBs which are associated with the same set of RACH preambles are then labeled with the one "SSB_assoc_index". The UE monitors RAR for a RAR transmitted with an RA-RNTI with the SSB_assoc_index in which the detected SSB is included.

An RNTI which depends on SSB provides a possibility to send independent Backoff Indicators (BI) in different beams, where each beam corresponds to a group of transmitted SSB. The RA-RNTI is defined based on the SS block group index in addition to slot index and frequency allocation in which the preamble was transmitted.

Quasi Co-Location

SSB and PRACH

Figure 13:
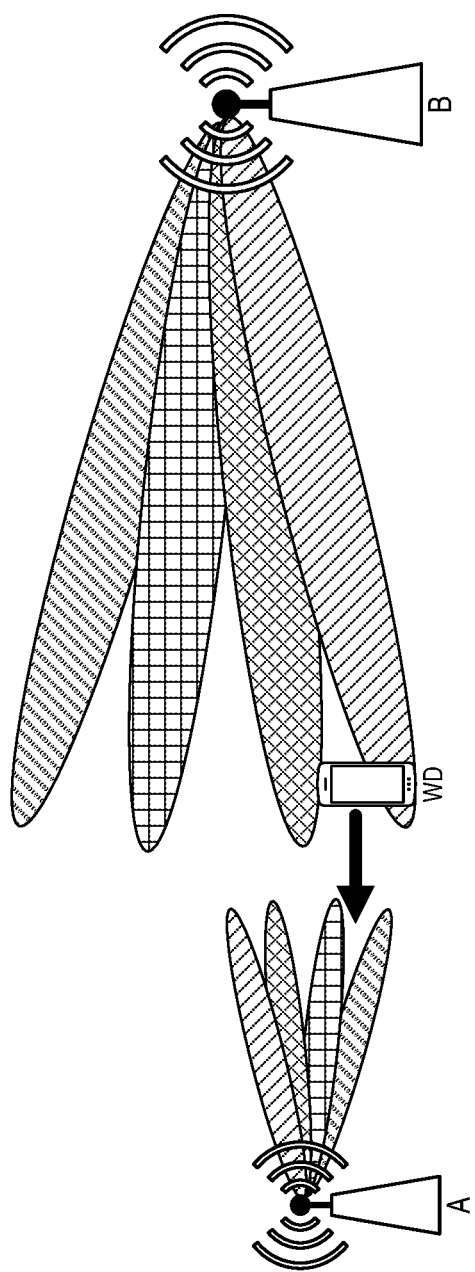
FIG. 13 illustrates a heterogeneous network in accordance with some embodiments.

Reciprocity (and use of reciprocal spatial QCL) in UE between received SS-block and NR-RACH preamble transmission should not always be used, even if the UE is capable of beam correspondence. Examples are silent nodes, where at least one gNB is not transmitting SS-blocks but can detect NR-RACH preambles, and within heterogeneous networks where the transmit powers differs between several gNBs transmitting SS-blocks, see the illustration in FIG. 13.

In these cases, the UE which is transmitting NR-RACH preambles based on beam correspondence and reciprocal spatial QCL from received SS-blocks, might transmit the NR-RACH preamble with a transmit power and with a beamforming in a non-reciprocal direction such that it is not detected at the node with best uplink link budget to the UE. In those scenarios, it is most likely better if the UE transmits the NR-RACH preamble with an as wide beam as possible instead of a narrow beam in the direction in which it received the SS-block. A configuration parameter can be included in a broadcast channel (indicating if the UE should transmit NR-RACH preambles based on reciprocity from received SS-block (if the UE is capable of doing that) or if the UE should use as wide beam as possible. This configuration can be included in Remaining System Information, RMSI, or in any other additional system information provided to UE as part of the RACH configuration.

The network configures the UE if it should transmit NR-RACH preambles based on reciprocity from received SS-block (if the UE is capable of beam correspondence) or if the UE should use a wide beam.

SSB and RAR

In NR, there are deployment scenarios with possible large timing offsets between received SS block and the RAR NR-PDCCH, where the synchronization signal in SSB may not be sufficient for receiving RAR. These effects are discussed in more detail in [5] where we show that an example timing and frequency offsets may be created where the NR-PDCCH detection performance will deteriorate. A silent node deployment scenario may cause large timing errors to the closest pico-node in an example deployment, also significantly degrading NR-PDCCH reception. Furthermore, spatial transmission patterns may differ. For example, the SS Block could be transmitted using multiple beams (e.g. to support PRACH processing) while the RAR message is sent via a wide PCI-based beam. Thus, in some deployments, NR-PDCCH carrying paging indication may not be reliably received using the default SSB as the sync source. Since the SS-block might be transmitted by another node as compared to RAR, the UE should in some cases not assume any QCL (Quasi Co-Location) of SS-block and RAR. Preferably, the use of QCL between SS-block and RAR is indicated in RMSI. On the other hand, when QCL is indicated, the UE may assume that the SS block and RAR are QCL with respect to Doppler shift, Doppler spread, delay spread, average delay, and spatial QCL.

In [5], a network setup in which the NW can transmit one or more SSB time indices as a wide-beam or cell-covering transmissions that are QCL (i.e. can be used as the sync reference) for access-related signals (RMSI, RAR, paging, etc.) while remaining time indices can be narrowly beamformed to provide higher-resolution beam direction info during access or to support active mode procedures; they can also be dynamically activated and configured. This is possible since existing agreements allow the NW to flexibly configure SSB transmissions for the different sweep time indices—it is not necessary to use the same beam width or power for all transmissions, or contiguous directions.

NR should support QCL association of RAR signals with suitable subsets of SSB transmissions during an SSB burst. In order to enable the SSB-based additional sync provision mechanism, the relevant QCL relationships and/or the use of off-grid SSBs must be signaled to the UE in order for the UE to configure system access, paging, or measurement signal reception with proper SSB reference and QCL assumptions. For RAR, the suitable UE receiver configuration with regard to SSB QCL relations can be indicated in RMSI. SIB1 thus configures the UE to use appropriate (QCL) SSB instances for relevant PDCCH/PDSCH reception.

RMSI indicates which time indices in the default SSB sweep should be used as QCL reference for PDCCH/PDSCH reception for RAR. RAN2 should define the contents of the SIB1 fields specifying RAR-SSB QCL properties.

RAR Contents

Relating to the payload of RAR, it was agreed in RAN2 #99 that the following fields are always included in the RAR random access procedures: RAPID, UL grant, TA, temporary C-RNTI for all cases other than msg. 1 SI request, and that BI can be included in msg. 2 as in LTE. UE behaviour with respect to backoff is the same as in LTE.

In this section, we discuss the size of these entities.

Random Access Preamble ID (RAPID)

In LTE, as there are 64 preambles per cell, the size of RAPID is 6 bits, which also served the purpose that MAC sub-header is octet-aligned. In NR, there might be a need for more than 64 preambles per cell and this means more than 6 bits is needed to convey the detected PRACH preamble in RAR. To deal with this issue, we propose that RAPID indicates a preamble index per SSB index, and instead indicate the SSB index using scrambling, i.e. including SSB index into RA-RNTI. We can thus assign a maximum of 64 preambles per SSB.

The estimated TA resolution depends on sub carrier spacing of PRACH preamble. The UL grant field within the DCI are not agreed yet within 3GPP. As there is only one RACH procedure at a time, there is no need of HARQ process id in UL grant of RAR.

The size of RAPID field is 6 bits. FFS size of UL grant field and TC-RNTI.

Timing Advance Command

We propose that the TA granularity is defined by the numerology specified in the uplink grant transmitted together with the TA command. The TA granularity (16 Ts) for different SCS is shown below in Table 5, where Ts=1/30720 ms for 15 KHz SCS, Ts=1/(2*30720) ms for 30 kHz SCS, Ts=1/(4*30720) ms for 60 kHz SCS, and Ts=1/(8*30720) ms for 120 kHz SCS.

TABLE 5

TA granularity for different SCS of MSG3

| SCS of MSG3 | TA granularity [us] |
| --- | --- |
| 15 KHz | 0.52 |
| 30 kHz | 0.26 |

TABLE 5-continued

TA granularity for different SCS of MSG3

| SCS of MSG3 | TA granularity [us] |
| --- | --- |
| 60 KHz | 0.13 |
| 120 KHz | 0.06 |
| 240 KHz | 0.03 |

TA granularity is defined by the numerology specified in the uplink grant transmitted together with the TA command In LTE, 11 bits are used for timing advance command. In NR, with different formats and subcarrier spacings for PRACH and MSG3, it is important to revisit this concept and see if 11 bits are necessary or to have less bits in TA to support low latency application.

Below we discuss the number of bits required for the agreed NR-RACH preamble formats.

The first two rows of Table 2 (include herein above) illustrates the agreed PRACH formats and corresponding maximum cell radius from RAN1 #AH2 and RAN1 #90, for a sub-carrier spacing (SCS) of 15 kHz of the NR-RACH preamble.

We note that the maximum cell radius for format B4 can be larger than the of 3 867 meters, if the gap after the preamble within a slot is considered. See illustration of format B4 in FIG. 1, with a gap of 792+144+2048+144+2048=5176 samples from end of B4 to the end of the slot, which corresponds to 24 570 meters. Detection of delays larger than the length of one OFDM symbol is described in [8] together with performance evaluations with a cell radius up to 20 km (delays up to 2 OFDM symbols with SCS of 15 kHz).

As noted herein, the number of bits needed for the TA (third row of the Table 2) is computed using equation (1). TA granularity is defined according to the sub carrier spacing of the Msg 3. The fourth row of the Table 2 is rounding to the closest integer larger than the number of bits in row 3.

This Table 2 is only valid for a sub-carrier spacing (SCS) of 15 kHz of the NR-RACH preamble. If the SCS of the NR-RACH preamble is doubled, then the maximum cell radius is reduced by a factor of two. The number of bits needed for TA is thus a function of the SCS of the NR-RACH preamble.

In summary, we observe that the number of bits for the TA command can be formulated as a function of both the SCS of PRACH and the SCS of MSG3.

Number of bits for the TA command can be a function both the SCS of PRACH and the SCS of MSG3.

If we base the actual number of bits for TA both on PRACH SCS and MSG3 SCS, we obtain Table 3, as included above. When we fix PRACH SCS (=>fixed Dmax) and change MSG3 SCS (=>Ts change), we get log2(2)=1 bit extra for each doubling of MSG3 SCS (as can be seen for each column). Instead if we fix MSG3 SCS and double PRACH SCS, then there is one less bit needed (−log2(2)) as can be seen if we fix a row and go across column wise. For the diagonal elements, as the SCS for PRACH and MSG3 both changes proportionally, there is no change in the number of bits.

The highlighted cells of Table 3 is what seems to be more relevant for efficient resource usage and better use of channel For example, it does not make sense to use a 15 kHz PRACH SCS with 240 kHz MSG3. We see that in this setup the number of bits needed is between [N−1, N+1], where N is defined in Table 2. From Table 2 and Table 3, it seems reasonable to use of TA of 5 bits (N+1 of A1 format) for small cells use case (A0, A1, B1) and 10 bits (N+1 of B4 extended delay use case) for rest of the short sequence formats.

Number of required bits for TA is 5 for small cells and 10 bits for normal cell operation and NR-RACH formats based on short sequences.

Besides the short preamble formats A-C introduced in Table 2, there is an agreement also on the long PRACH preamble formats 0, 1, and 4, which are based on 1.25 kHz SCS, while format 3 is based on 5 kHz SCS. These formats are similar to the LTE PRACH formats where 11 bits are used for TA. It seems reasonable to define at least as many bits for NR as was defined for LTE, in order to support at least the same cell radius in LTE and NR.

Define 5 bits for TA for PRACH format A0, A1 and B1, and 11 bits for remaining NR-RACH formats.

RAR Transmission

Agreements related to RAR transmission:

Agreements in RAN1 #90: At least for initial access, RAR is carried in NR-PDSCH scheduled by NR-PDCCH in CORESET configured in RACH configuration. Note: CORESET configured in RACH configuration can be same or different from CORESET configured in NR-PBCH.

Agreements in RAN 1 #AH3: NR supports at least slot based transmission of Msg2, Msg3 and Msg4. Check if slot based scheduling can satisfy ITU requirement. If not, investigate ways to meet ITU requirement, e.g., non-slot based transmission of Msg2, Msg3 and Msg4.

The following agreements were made regarding PDCCH in slot and mini-slot (aka, non-slot based scheduling).

Agreements in RAN1 #87: NR-PDCCH monitoring at least for single-stage DCI design, NR supports the following minimum granularity of the DCI monitoring occasion. For slots: once per slot. When mini-slots are used: FFS if every symbol or every second symbol, and FFS with respect to which numerology if slot and mini-slot have different numerology (e.g. SCS, CP overhead). It should be noted that slot/mini-slot alignment is not assumed here and this may not apply in all cases.

We propose to have possibility of RAR transmission in non-slot based scheduling (interpreted as mini-slots in the text below) besides the slot based scheduling. Scheduling RAR in non-slot based scheduling is especially beneficial for supporting low latency and for reducing the resource overhead.

Low latency:

Transmitting in non-slot based scheduling gives the possibility of reducing the time for the successful RACH procedure as PDSCH transmissions can happen much faster For analog beamforming, if RAR is transmitted in non-slot based scheduling, then beam sweeping in different directions is possible in very short time compared to the case when RAR is transmitted with slot based scheduling.

It is beneficial for supporting low latency even in the case of digital beamforming when RAR is sent by non-slot based scheduling.

Reduction of resource overhead:

When RAR is sent by slot based scheduling, then rest of the frequency resources in a time interval are only usable for UEs in the same direction as the transmitted RAR, when analog beamforming is performed. Instead in this scenario, it is better to allocate many of the frequency resources to RAR and reduce the time interval by non-slot based scheduling of RAR. This serves purpose of using most of the time-frequency grid in a resource efficient way.

The RAR can be frequency multiplexed with an SS block if the RAR support non-slot based scheduling. This reduce overhead since sub-carriers outside the SS block allocation can then be used with an analog transmitted beamforming. Typically, a RAR can then be transmitted simultaneously and, with analog transmitter beamforming, in the same direction as an frequency multiplexed SS block.

Support RAR transmissions in non-slot based scheduling (i.e., mini-slot) in addition to already agreed slot based scheduling.

We proposed to support RAR transmission in both slot-based and non-slot based scheduling, and we proposed similarly to support CORESET starting position in both slot-based and non-slot boundaries. This will make it possible to have a case when latency needs to be reduced.

Support CORESET starting positions aligned with both slot boundary and with non-slot boundary.

In some deployments as described in detail in [4], NR-PDCCH carrying RAR may not be reliably received using SSB as the sync source. Similar problems can arise in paging and additional system information (RMSI) distribution. Instead of individually addressing all scenarios where sync for NR-PDCCH reception is insufficient, the problem should be solved by introducing an additional flexibly configurable sync signal. Such a signal can be transmitted in close vicinity to NR-PDCCH when required by the deployment or a specific configuration. In [4], we further discuss using a signal similar to NR-PSS for such flexible sync provision.

The physical channel carrying RAR can be configured with an additional synchronization signal for time and frequency synchronization.

As soon as the UE receives RAR, it adjusts its UL timing based upon the TA command. Since the proposed RAR can contain an additional reference signal, it can also adjust its DL timing, as illustrated in FIG. 1. Therefore, this RAR design with an additional reference signal is useful both for DL synchronization and demodulation of the RAR payload.

Similar to LTE, we propose that in NR, RAR message must be able to carry several detected preambles. Same PDCCH and common DMRS can be used with RAR containing above payload for several preambles, leading to a flexible payload size.

The physical channel carrying RAR is designed to support a flexible payload size.

This proposal is in agreement with RAN2 #99 proposal for RAR multiplexing i.e., multiple RARs in one PDU. MAC aspects of RAR with respect to multiplexing and more details are discussed in [3]. Besides carrying the payload, gNB needs to distinguish RARs sent to different UEs.

The gNB should transmit the RAR in the same beam as the SS-block when the UE is configured for spatial QCL between RAR and SS-block. In cases when the SS-block and the RAR are not spatial QCL, the gNB might transmit a RAR corresponding to one detected NR-RACH preamble in several spatial beams. By using several beams in the transmitter of the gNB, the probability for correct detection of the RAR increases. These RAR, for the same detected NR-RACH preamble, might be transmitted at different time intervals but anyway indicate the same message 3, by the decision in RAN1 #87: "UL grant in message 2 may indicate the transmission timing of message 3".

Several RAR corresponding to the same detected NR-RACH preamble might be transmitted from gNB with different beams, which increase RAR detection rate. If a UE receives and decodes several RAR corresponding to the transmitted NR-RACH preamble, then the UE must select one of these RAR. This selection might for example be based on received signal strength or SNR of the DMRS associated with RAR. If a UE detects several RAR corresponding to same detected NR-RACH preamble, then the UE select one of these RAR based on received DMRS associated to RAR.

Configuration of Message 3

Three options were agreed in RAN1 #88bis regarding configuration of sub-carrier spacing (SCS) of message 3. Agreements: Option 1: RACH configuration (possibly within PBCH or the remaining minimum system information) provides the SCS of the RACH msg. 3. Option 2: The same SCS applied in PBCH transmission is used for the transmission of the RACH msg. 3. Option 3: RAR can indicate the SCS of the RACH msg. 3 transmission Here, option 1 is similar to the decision in RAN1 #88bis regarding configuration of waveform for message 3.

Agreements: Waveform for RACH message 3 can be DFT-S-OFDM or CP-OFDM. Network signals directly or indirectly RACH message 3 waveform to UE: the network signals the waveform for RACH message 3 in the remaining minimum SI as one bit.

Option 2 would result in a relation between SCS used in downlink and uplink which is not desirable. Option 3 has the possibility to adjust the SCS individually for each detected NR-RACH preamble. However, this would lead to a mix of several simultaneous SCS in uplink which should be avoided. The network signals the sub-carrier spacing for RACH message 3 in the remaining minimum SI. Regarding the HARQ retransmissions, retransmissions of msg 3 would need a retransmission of the RAR also as the grant for msg3 is given in RAR (msg 2).

PRACH Power Ramping

Previous meetings have made decisions about the PRACH preamble as well as the 4 step RA procedure. Some aspects of power ramping in the PRACH Msg. 1 still remain to be agreed.

The choice of the SSB and the corresponding resource set for initial PRACH transmission is a critical element for ensuring efficient system access and minimizing its impact on the UL capacity of the network. According to a recent agreement, the choice of the SSB is up to the UE, subject to the link corresponding to the SSB satisfying an absolute quality threshold criterion. The aim of the procedure is to ensure that the UE can find and proceed with a sufficiently good SSB in a relatively short time, while avoiding hasty PRACH transmission in response to a low-quality SSB or waiting excessively long time to ensure that all possible SSB in the area have been evaluated.

One remaining issue is the choice of the threshold and the maximum number of reception attempts if the threshold is not reached by the SSBs received so far. It has been agreed that the threshold for SSB link quality acceptance for PRACH transmission should be configurable by the network. In order to ensure power-efficient operation, the UE continues detecting and measuring SSBs until an SSB satisfying the threshold is found. If no such SSB is found during the SSB repetition period of the network, the UE determines which of the detected SSB to respond to with PRACH. This is subject to being able to close the link budget given the path loss associated with the SSB. The typical choice would be to use the strongest detected SSB.

If no SSBs are detected satisfying the threshold, the UE continues SSB detection during a time duration equal to the SSB period. A retransmission of the RACH preamble is needed if the UE is unable to decode a RAR. It is up to UE implementation to decide if it retransmits a preamble in a set of preambles corresponding to previously used SSB or change to preambles associated with another SSB. If the UE use the preamble set corresponding to the previously used SSB, then the power ramping as decided in RAN1 #89 is used (i.e. if the UE conducts beam switching, the counter of power ramping remains unchanged). If on the other hand, the UE decides to use a preamble set associated to another SSB, then the UE should base the path loss estimation based on this new SSB.

It should be up to UE implementation to determine whether to continue ramping on the same SSB (and the same set of preambles) or to change the SSB. For each SSB (and the associated set of preambles), the UE should base the PRACH preamble TX power on the path loss derived from the RSRP estimate associated with that SSB.

By agreeing that beam switching leaves the power ramping unchanged, it is possible to envision a functionality that is similar to that of LTE 00. What differs is the number of antennas and the resulting beamforming they may produce and the possibility for beam correspondence or not. Below, the power ramping discussion is divided into three sections: Initialization, incrementation and termination.

The key performance indicators for random access are twofold: to minimize transmitted interference, and to minimize random access latency. Hence, a "first shot right" is desirable although often unrealistic. For the two UE types with and without beam correspondence, it is respectively more and less likely to achieve this. For this reason, requirements for UEs with beam correspondence could be made stricter but also more predictable in order to achieve a faster PRACH procedure. This is possible without the serving cell knowing about the UE capability in this respect.

The behavior of UEs with beam correspondence may be more strictly defined in order to achieve a more efficient PRACH procedure. One such stricter definition is the decision of which beam to use in the UL in UEs with beam correspondence. Reasonably, the corresponding beam to the DL beam is the preferred choice.

A UE with beam correspondence should use same corresponding beam in UL as in DL. If the UE is transmitting at maximum power and does still not to receive a Random Access Response (RAR), or a received RAR does not contain a preamble identifier corresponding to the transmitted RA preamble, the random access cycle has been unsuccessful. Such a situation could either depend on the UE being out-of-coverage for the serving cell, or due to the UE using too wide beamforming or beamforming pointing in the wrong direction. Similar to LTE, following a failed full random access cycle, a random back-off period that must pass before the UE may initiate another random access cycle, possibly with different beamforming directions, should be defined.

In case of a failed random access cycle, a random back-off period must pass before the UE may attempt another random access cycle. Furthermore, the new PRACH attempt should be starting over with the initial power values. In case of a failed random access cycle, the PREAMBLE_TRANSMISSION_COUNTER is reset.

Message 3 Power Settings

Within Msg. 2, the UE will receive a UCI, including UL power control 0. In order for that to be purposeful, and for a UE to optimize its Msg. 3 transmission, it should be obliged to follow the UCI in Msg. 2.

The UE shall adjust its power setting for Msg. 3 with respect to the Msg. 2 UCI. Another aspect of Msg. 3 in relation to Msg. 1 is the UE antenna configuration. For example, in mmW, it is possible to envision UEs with different antenna panels where only a subset of the panels is used at a time. In order to get a predictable and relevant result from such UEs, it is important that the same antenna configuration is used in Msg. 3 as was used for Msg. 1.

The UE shall use the same antenna configuration in Message 3 as in Message 1. Using the same beam configuration can be seen as being part of [0208]. Nevertheless, if the UE is allowed to change beams between Msg. 1 and Msg. 3, in order to obtain a predictable and relevant result, the UE should adjust the beam forming gain accordingly.

If a UE is allowed to change beams between Msg. 1 and Msg. 3, any change in processing gain arising from such beam change must be included in the power control formula.

CONCLUSION

We have made the following observations:

Observation 1: Number of bits for the TA command can be a function both the SCS of PRACH and the SCS of MSG3.

Observation 2: Number of required bits for TA is 5 for small cells and 10 bits for normal cell operation and NR-RACH formats based on short sequences.

Observation 3: Several RAR corresponding to the same detected NR-RACH preamble might be transmitted from gNB with different beams, which increase RAR detection rate:

Observation 4: The behavior of UEs with beam correspondence may be more strictly defined in order to achieve a more efficient PRACH procedure. In view of the preceding observations, we proposed the following:

Proposal 1: The RA-RNTI is defined based on the SS block group index in addition to slot index and frequency allocation in which the preamble was transmitted.

Proposal 2: The network configures the UE if it should transmit NR-RACH preambles based on reciprocity from received SS-block (if the UE is capable of beam correspondence) or if the UE should use a wide beam Proposal 3: NR should support QCL association of RAR signals with suitable subsets of SSB transmissions during an SSB burst.

Proposal 4: RMSI indicates which time indices in the default SSB sweep should be used as QCL reference for PDCCH/PDSCH reception for RAR.

Proposal 5: RAN2 should define the contents of the SIB1 fields specifying RAR-SSB QCL properties.

Proposal 6: The size of RAPID field is 6 bits. FFS size of UL grant field and TC-RNTI.

Proposal 7: TA granularity is defined by the numerology specified in the uplink grant transmitted together with the TA command Proposal 8: Define 5 bits for TA for PRACH format A0, A1 and B1, and 11 bits for remaining NR-RACH formats.

Proposal 9: Support RAR transmissions in non-slot based scheduling (i.e., mini-slot) in addition to already agreed slot based scheduling.

Proposal 10: Support CORESET starting positions aligned with both slot boundary and with non-slot boundary.

Proposal 11: The physical channel carrying RAR can be configured with an additional synchronization signal for time and frequency synchronization.

Proposal 12: Design the physical channel carrying RAR that supports a flexible payload size.

Proposal 13: If a UE detects several RAR corresponding to same detected NR-RACH preamble, then the UE select one of these RAR based on received DMRS associated to RAR Proposal 14: The network signals the sub-carrier spacing for RACH message 3 in the remaining minimum SI Proposal 15: If no SSBs are detected satisfying the threshold, the UE continues SSB detection during a time duration equal to the SSB period.

Proposal 16: It should be up to UE implementation to determine whether to continue ramping on the same SSB (and the same set of preambles) or to change the SSB.

Proposal 17: For each SSB (and the associated set of preambles), the UE should base the PRACH preamble TX power on the path loss derived from the RSRP estimate associated with that SSB.

Proposal 18: A UE with beam correspondence should use same corresponding beam in UL as in DL.

Proposal 19: In case of a failed random access cycle, a random back-off period must pass before the UE may attempt another random access cycle.

Proposal 20: In case of a failed random access cycle, the PREAMBLE TRANSMISSION COUNTER is reset.

Proposal 21: The UE shall adjust its power setting for Msg. 3 with respect to the Msg. 2 UCI.

Proposal 22: The UE shall use the same antenna configuration in Message 3 as in Message 1.

Proposal 23: If a UE is allowed to change beams between Msg. 1 and Msg. 3, any change in processing gain arising from such beam change must be included in the power control formula.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1xRadio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPPLTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCHNarrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMIPrecoder Matrix Indicator
PRACH Physical Random Access Channel
PRSPositioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TS S Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
U IRA Universal Terrestrial Radio Access
U IRAN Universal Terrestrial Radio Access Network
WCDMA Wide CDMA
WLAN Wide Local Area Network

REFERENCES

[1] R1-178719, "Multiple Preamble Transmissions", Ericsson, TSG RAN WG1 Meeting #90bis, Prague, Czech Republic, October 9-13 Oct. 2017

[2] R1-1716154, "Remaining details on NR-RACH formats", Ericsson, 3GPP TSG RAN WG1 Meeting Ad-Hoh #3, Nagoya, Japan, 18-22 Sep. 2017

[3] R2-1708193, "MAC RAR PDU Design", Ericsson, 3GPP TSG RAN WG2 Meeting #99, Berlin, Germany, 21-25 Aug. 2017

[4] R1-1716158, "Additional synchronization provision", Ericsson, 3GPP TSG RAN WG1 Meeting Ad-Hoh #3, Nagoya, Japan, 18-22 Sep. 2017

[5] 3GPP TS 36.213. *Evolved Universal Terrestrial Radio Access (E-UTRA); Medium Access Control (MAC) protocol specification (Release 12)*, March, 2016.

[6] 3GPP TS 36.321. *Evolved Universal Terrestrial Radio Access (E-UTRA); Physical layer procedures (Release 12)*, September, 2016.

[7] R1-1711383, "4-*step random access procedure*", Ericsson, 3GPP TSG-RAN WG1 NR AH #2, Qingdao, P.R. China, 26-30 Jun. 2017

[8] R1-1702127, "NR PRACH design", Ericsson, TSG-RAN WG1 Meeting #88, Athens, Greece, Feb. 13-17, 2017.

[9] 3GPP TS 36.213. *Evolved Universal Terrestrial Radio Access (E-UTRA); Physical Layer Procedures,* V14.2.0 (2017-03).

[10] R1-1718716, "Remaining details on RACH procedure", Ericsson, TSG-RAN WG1 Meeting #90bis, Prague, Czech Republic, 9-13 Oct. 2017.

What is claimed is:

1. A method performed by a wireless device for communication with a cellular communication network, the method comprising:
receiving a physical random access channel (PRACH) preamble format from a network node;

deriving a timing advance (TA) range for the wireless device based on the PRACH preamble format, the TA range having a number of bits determined based on an applied subcarrier spacing to be used for the communication, the number of bits being determined by an equation:

$$Num\ bits = \log 2 \frac{2D\max}{c16Ts};$$

Dmax being a maximum cell radius, c being the velocity of light, and Ts being inverse of a subcarrier spacing of a MSG3; and transmitting a PRACH preamble sequence to the network node.

2. The method of claim 1, wherein the PRACH preamble sequence is associated with a maximum cell radius.

3. The method of claim 1, wherein the TA range depends on a subcarrier spacing of the PRACH and the subcarrier spacing of the MSG3.

4. The method of claim 1, wherein the TA range is one of 5 bits and 11 bits.

5. The method of claim 1, further comprising:
receiving a random access response (RAR) from the network node; and
adjusting a timing alignment based on a TA value indicated by the RAR received from the network node.

6. The method of claim 5 wherein the RAR includes a field indicating a TA value included in the TA range.

7. A method of configuring a wireless device for communication with a network node in a cellular communication network, the method comprising:
generating a PRACH preamble configuration to be used by the wireless device;
transmitting the PRACH preamble configuration to the wireless device;
receiving a PRACH preamble sequence from the wireless device, wherein the PRACH preamble sequence is based on a TA range derived by the wireless device based on the PRACH preamble configuration; and
transmitting a RAR indicative of a TA value based on the TA range to permit the wireless device to perform a time alignment adjustment.

8. The method of claim 7, wherein the network node is a gNodeB.

9. The method of claim 7, wherein the TA range is a number of bits between 5 bits and 11 bits.

10. The method of claim 7, wherein the TA range has a number of bits determined based on an applied subcarrier spacing to be used for the communication.

11. The method of claim 10, wherein the number of bits is determined by the equation:

$$Num\ bits = \log 2 \frac{2D\max}{c16Ts};$$

wherein Dmax is a maximum cell radius, c is the velocity of light, and Ts is inverse of the subcarrier spacing of a MSG3.

12. The method of claim 7, wherein the TA range depends on a subcarrier spacing of the PRACH and a subcarrier spacing of the MSG3.

13. A wireless device comprising:
an antenna configured to send and receive wireless signals;
radio front-end circuitry connected to the antenna and to processing circuitry, and configured to condition signals communicated between the antenna and the processing circuitry;
the processing circuitry being configured to perform operations comprising:
receiving a PRACH preamble format from a network node; deriving a timing advance (TA) range for the wireless device based on the PRACH preamble format, the TA range having a number of bits determined based on an applied subcarrier spacing to be used for the communication, the number of bits being determined by an equation:

$$Num\ bits = \log 2 \frac{2D\max}{c16Ts};$$

Dmax being a maximum cell radius, c being the velocity of light, and Ts being inverse of a subcarrier spacing of a MSG3; and
transmitting a PRACH preamble sequence to the network node; and
a battery connected to the processing circuitry and configured to supply power to the wireless device.

14. The wireless device of claim 13, wherein the PRACH preamble sequence is associated with a maximum cell radius.

15. The wireless device of claim 13, wherein the TA range depends on a subcarrier spacing of the PRACH and the subcarrier spacing of the MSG3.

16. The wireless device of claim 13, wherein the TA range is one of 5 bits and 11 bits.

17. The wireless device of claim 13, wherein the operations further comprise:
receiving a random access response (RAR) from the network node; and
adjusting a timing alignment based on a TA value indicated by the RAR received from the network node.

18. The wireless device of claim 13, wherein the RAR includes a field indicating a TA value included in the TA range.

19. A network node for communication in a cellular communication network, the network node comprising:
a communication interface configured to receive user data originating from a transmission from wireless device; and
processing circuitry configured to perform operations comprising:
generating a PRACH preamble configuration to be used by the wireless device;
transmitting, via the communication interface, the PRACH preamble configuration to the wireless device;
receiving a PRACH preamble sequence from the wireless device, wherein the PRACH preamble sequence is based on a TA range derived by the wireless device based on the PRACH preamble configuration; and
transmitting, via the communication interface, a RAR indicative of a TA value based on the TA range to permit the wireless device to perform a time alignment adjustment.

20. The network node of claim 19, wherein the network node is a gNodeB.

21. The network node of claim 19, wherein the TA range is a number of bits between 5 bits and 11 bits.

22. The network node of claim 19, wherein the TA range has a number of bits determined based on an applied subcarrier spacing to be used for the communication.

23. The network node of claim 22, wherein the number of bits is determined by the equation:

$$Num\ bits = \log 2 \frac{2D\text{max}}{c16Ts};$$

wherein Dmax is a maximum cell radius, c is the velocity of light, and Ts is inverse of the subcarrier spacing of a MSG3.

24. The network node of claim 19, wherein the TA range depends on a subcarrier spacing of the PRACH and a subcarrier spacing of the MSG3.

* * * * *